May 27, 1952 — H. J. EASTMAN — 2,598,520
BOREHOLE TEMPERATURE RECORDER
Filed April 19, 1946 — 2 SHEETS—SHEET 1
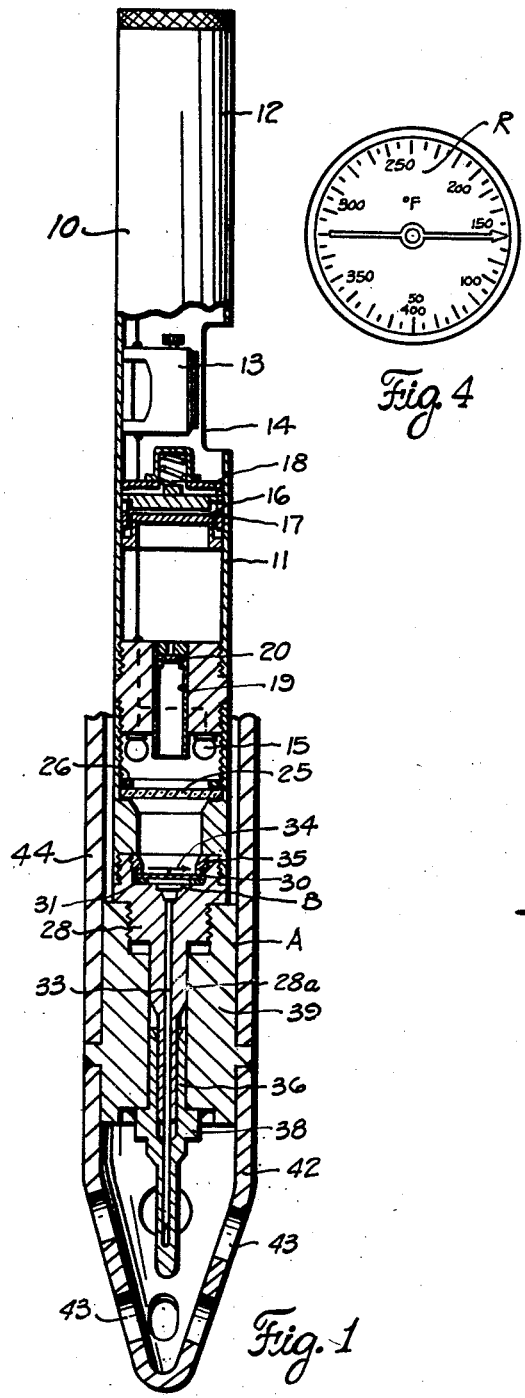
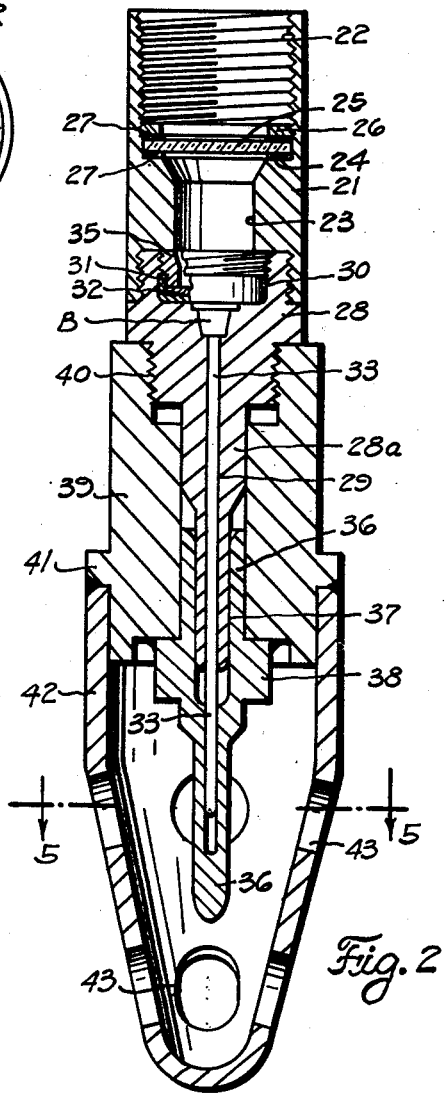
Harlan J. Eastman
INVENTOR.
BY Joe E. Edwards
ATTORNEY.

May 27, 1952      H. J. EASTMAN      2,598,520
BOREHOLE TEMPERATURE RECORDER
Filed April 19, 1946      2 SHEETS—SHEET 2
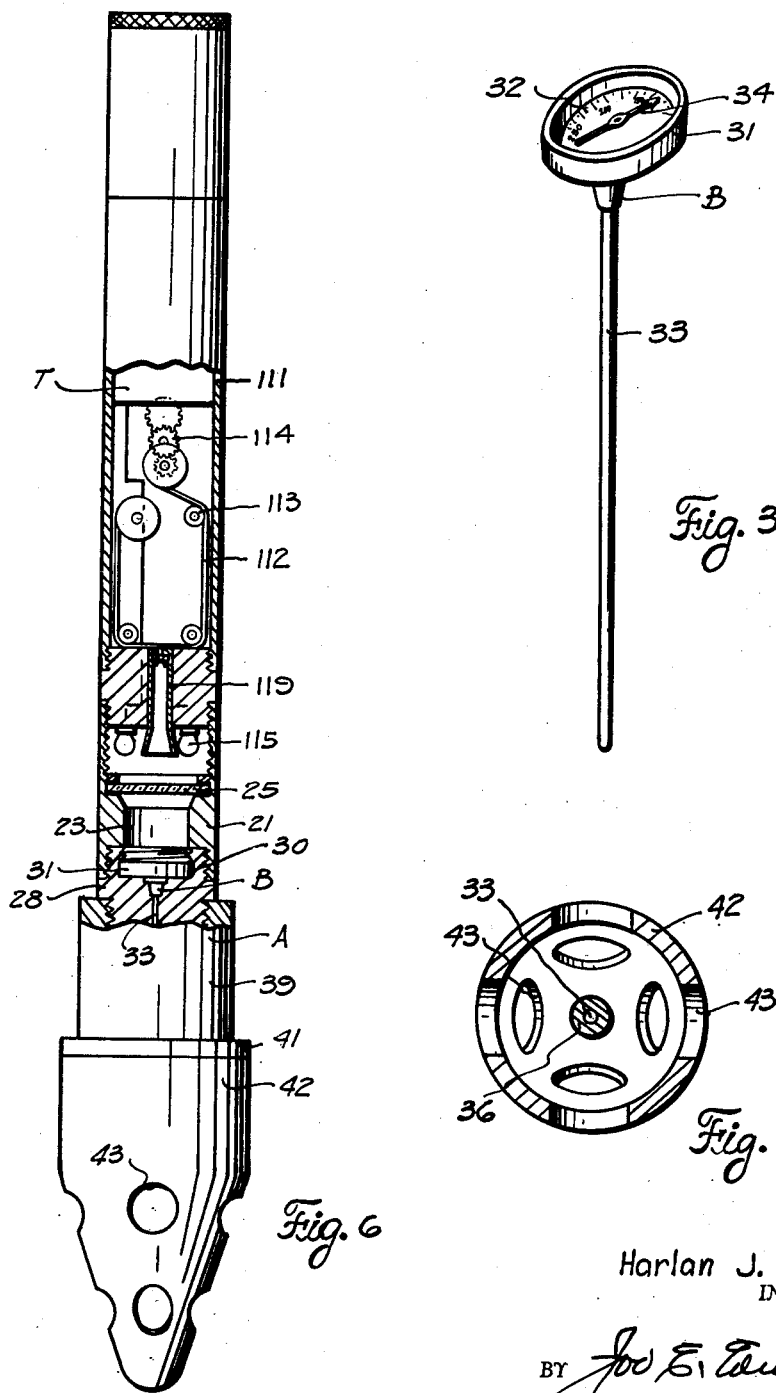
Harlan J. Eastman
INVENTOR.
BY Jod E. Edwards
ATTORNEY.

Patented May 27, 1952

2,598,520

UNITED STATES PATENT OFFICE 2,598,520

BOREHOLE TEMPERATURE RECORDER

Harlan J. Eastman, Denver, Colo., assignor to Eastman Oil Well Survey Company, Denver, Colo., a corporation of Colorado Application April 19, 1946, Serial No. 663,365

2 Claims. (Cl. 73—343)

This invention relates to new and useful improvements in temperature measuring devices.

One object of the invention is to provide an improved temperature measuring device which is adapted to be lowered into a well bore to the desired depth therein and which has means for accurately measuring and recording the temperature of said well bore at said depth.

An important object of the invention is to provide an improved temperature measuring and recording device wherein a thermometer is combined with a photographic type of survey instrument, whereby the device may be run into and removed from the well bore by means of a wire line or cable in the usual manner and also whereby a permanent photographic record of the temperature indication may be obtained at any desired elevation or point within the well bore.

Another object of the invention is to provide an improved temperature measuring and recording device, of the character described, wherein the thermometer assembly is in the form of a separate unit which is so constructed that it may be readily attached to a photographic type of survey instrument, said unit replacing and being substituted for the ordinary inclination and direction indicating unit of the survey instrument.

Still another object of the invention is to provide an improved temperature measuring device, of the character described, having its thermometer element mounted within a protective casing, whereby the element is protected against damage during lowering and raising of the device within a well bore, the protective casing being constructed so that the normal accurate functioning of the thermometer element is not interfered with and accurate measurement of the well bore temperature may be made.

A further object of the invention is to provide an improved temperature measuring device, of the character described, wherein an ordinary testing thermometer of standard construction may be incorporated into the unit, whereby the construction is simplified and manufacturing costs are reduced.

A particular object of the invention is to provide a temperature measuring and indicating unit which may be readily connected to either a "single shot" survey instrument or a "multiple shot" survey instrument, whereby either a single record of well bore temperature at one elevation or a plurality of records of well bore temperature at various spaced elevations may be obtained, the plurality of records being obtainable upon a single run of the device within a well bore.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a view, partly in elevation and partly in section of temperature measuring and recording device, constructed in accordance with the invention, Figure 2 is an enlarged, transverse, vertical sectional view of the thermometer unit or assembly, Figure 3 is an isometric view of the thermometer, Figure 4 is a plan view of the record made by the device, Figure 5 is a horiontal, cross-sectional view, taken on the line 5—5 of Figure 2, and Figure 6 is a view, similar to Figure 1, showing the temperature measuring unit attached to a multiple shot type of survey instrument to permit recording of a plurality of records.

In the drawings, the numeral 10 designates an ordinary photographic type of well survey instrument. This instrument includes a tubular casing or housing 11 which has a battery section 12 in its upper end. A watch or timing mechanism 13 is mounted within the casing and is accessible through a slot 14 in one side of the instrument housing. The watch or timing mechanism may be properly set to control the closing of an electrical circuit to electric lamps 15 which are mounted in the lower end of the instrument housing. A photographic disk 16 which is constructed of photographic film is adapted to be inserted into the housing through a loading slot 17, the opening and closing of said slot being controlled by a depressible closure member 18 which is disposed within the housing and which has its upper end accessible through the opening 14 for manual operation.

When the photographic disk 16 is in position within the housing it is disposed axially above a camera lens tube 19 which has a lens 20 in its upper end. When the watch or timing mechanism 13 closes the electrical circuit to the lamps 15, said lamps are illuminated to expose the photographic film 16 and thereby photograph the object which is located below the lens tube 19. The construction of this portion of the instrument 10 is well known in the art of well surveying and many instruments, known as "single shot" well survey instruments are now in general use. Ordinarily a plumb bob and compass unit (not shown) is connected to the lower end of the housing 11 so that when the instrument is operated a photograph of the compass and plumb bob within said unit appears on the photographic disk 16.

In carrying out the present invention, the usual plumb bob and compass unit which is ordinarily connected to the lower end of the instrument housing 11, is eliminated and in place thereof a temperature measuring and indicating unit A (Figure 2) is substituted therefor and comprises an adapter collar 21 which has the upper end of its bore screw threaded at 22 for connection to the instrument housing 11. This adapter collar has the lower end 23 of its bore reduced, whereby an internal annular shoulder 24 is formed therein. A transparent cover glass 25 is supported upon the shoulder 24 and is retained in position by a retaining ring 26 with suitable packing rings 27 being interposed between the glass and the shoulder, as well as between the glass and said ring.

Connected to the lower end of the adapter collar 21 is a body member 28 and this body member is formed with an elongate depending shank 28a, which shank has an axial bore 29 extending entirely therethrough. The upper end of the body member 28 is formed with a recess or chamber 30 and a testing thermometer B is adapted to be supported within the body member and shank. The thermometer illustrated is of a standard type and as an example a testing thermometer known as model 226L and manufactured by the Weston Electrical Instrument Corporation of Newark, New Jersey may be employed. This thermometer includes an annular head portion 31 having a dial 32 supported therein. Extending downwardly from the head portion is an elongate tubular stem 33 within which is disposed the thermal element (not shown). The upper end of the thermal element is attached to the indicating needle 34 and obviously as the element within the stem 33 is affected by temperature, the indicator needle 34 is moved with respect to the dial 32.

As is clearly shown in Figure 2 the head portion 31 of the thermometer is seated within the recess or chamber 30 and the tubular stem 33 extends downwardly through the bore 29 of the shank 28a. The head portion of the thermometer is retained in position by a retaining ring 35 which threads into the upper end of the body member and which has a flange engaging the indicator dial 32, whereby the thermometer is held against upward displacement from the body member 28. It will be apparent that when the collar 21 is connected to the lower end of the instrument housing 11, as shown in Figure 1, the indicating needle 34 of the thermometer B will be disposed directly beneath the lens tube 19 of the instrument. Thus, when the timing mechanism 13 closes the circuit to the lamps 15 to illuminate the same, a photograph of the thermometer dial 32 and its indicating needle 34 will be taken to provide a record of the thermometer reading at the time that the exposure is made.

To protect the thermometer B during lowering and raising of the device within a well bore, a protective sleeve 36 has its upper portion slidable over the lower portion of the shank 28a. The lower portion of the sleeve has a bore 37 which receives the extreme lower end of the stem 33 of the thermometer. An annular integral collar 38 is formed on the external surface of the sleeve 36 and the upper portion of this collar is welded or otherwise secured to an enlarged coupling member 39 which has its upper end connected by screw threads 40 to the body 28. The lower portion of the coupling member 39 has an outwardly directed annular flange 41 and this flange is welded or otherwise secured to a hollow bull plug 42. As is clearly shown in Figure 2 the bull plug completely encloses the lower end of the thermometer stem 33 and its protective sleeve 36 and serves to protect these parts from damage during lowering or raising of the device through the well bore. The bull plug 42 is provided with a plurality of openings 43, whereby the fluid within the well bore may freely circulate around the protective sleeve 36 and the lower portion of the stem 33 of the thermometer, whereby the actual temperature in the well bore may act upon the stem to provide for accurate readings. The upper portion of the annular flange 41 on the coupling member 39 provides for the engagement of the outer protective barrel 44 which barrel completely surrounds the entire survey instrument when said instruent is run into the well bore.

The operation of the device is believed to be obvious. The temperature measuring and indicating unit A is connected to the lower end of the instrument housing 11 and the timing mechanism or watch 13 of the instrument is then set to permit the desired time lapse to allow lowering of the device to the desired elevation within the well bore. The instrument is then placed within the outer barrel 44 and the upper end (not shown) of this barrel is attached to the usual wire line or cable, whereby the entire assembly may be lowered.

The device is lowered to the proper position or elevation within the well bore and is permitted to stand at rest for a sufficient length of time to allow the thermal element of the thermometer B to be acted upon by the temperature within said bore so that the indicating needle 34 may move to proper indicating position on the dial 32. The previous setting of the timing mechanism or watch allows the thermometer sufficient time to accurately indicate temperature, after which the circuit to the electric lamps 15 is lighted. The exposure of the film disk 16 within the instrument housing photographs the dial 32 and the indicator 34, whereby a photograph or record R, such as shown in Figure 4 is obtained. After the instrument 10 has been operated and the photograph made, the assembly is removed from the well bore and brought to the surface. The photographic disk 16 is then developed to produce the record of Figure 4 and an accurate reading of the temperature of the well bore at the predetermined elevation is thereby obtained.

The device is extremely simple in that an ordinary well survey instrument of usual construction may be combined with a standard testing thermometer to produce the desired information. The thermometer is fully protected against jars and shocks which may occur during raising or lowering of the assembly and the particular construction of the bull plug 42 assures that accurate temperature readings will be obtained. The measuring and indicating assembly A is a single unit which may be easily attached to the standard survey instrument in place of the ordinary compass and plub bob unit usually connected to the instrument.

The device shown in Figures 1 to 5 illustrates the improved temperature measuring and indicating unit A connected to the usual "single shot" type of well survey instrument, wherein only a single record is obtained. However, the unit may be combined with other types of well survey instruments and in Figure 6 the unit A is shown attached to the lower end of a "multiple shot" survey instrument. As is well known, a multiple shot instrument includes an instrument housing 111 having a photographic film strip 112 disposed therein and properly wound on spools 113. A driving mechanism 114 controlled by a suitable timing mechanism T imparts intermittent movement to the film strip 112 and at the same time controls the light of electric lamps 115. A lens tube 119 focuses the object below said tube onto the movable film strip 112.

Ordinarily a plub bob and compass unit is disposed below the lens unit and is photographed upon the intermittent operation of the instrument. However, in place of this plumb bob and compass unit (not shown) the temperature measuring and indicating unit A is attached to the instrument housing 111 below the lens tube and lamps 115. With this arrangement, it will be apparent that the device may be lowered within a well bore and will make a series of photographs on the film strip at predetermined time intervals and at predetermined elevations within the well bore. In this manner, a complete temperature survey of the well bore throughout its entire length may be made. It is apparent that this form of the invention has all the advantages of the first form with the additional advantage of being able to make a series of records throughout the well bore as the device is lowered therethrough.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In an instrument for lowering into an earth bore to measure and record temperatures therein, a housing structure having upper and lower sections with each section provided with cooperating threaded ends for ready attachment and detachment, a temperature responsive element carried by the lower section of the housing structure and having a portion extending beyond the lower end thereof, the upper end of the said lower section having a central bore adjacent its threaded end, a dial mounted on the upper end of the temperature responsive element and positioned face upward in the bore, a pointer for the dial connected to be operated by the temperature responsive element, photographic means within the upper section of the housing structure for photographing the dial and pointer to thus obtain a record of the indicated temperature, said photographic means comprising a partition near the lower end of the upper section, a lens opening therein, recording film above the partition and a source of controlled light below the partition for illuminating the dial by unobstructed direct rays when the sections are screwed together, and means including time means in the said upper section above the partition for controlling the operation of the photographic means.

2. A temperature measuring instrument for ready attachment and detachment as a unit to the lower threaded end of a well survey instrument casing containing time controlled photographic means after a portion of said well survey instrument contained in a detachable casing has been removed, and wherein the well survey instrument casing containing the time controlled photographic means has a light source at its lower end producing illuminating rays which are directed downwardly toward the threaded end of the casing, a lens and recording film above the light source, and time controlled means for the light and film, said temperature measuring instrument unit comprising a housing structure having a threaded end for attaching the survey instrument casing portion and being provided with a bore extending inwardly from said threaded end, a temperature responsive means carried by the housing and being provided with a dial and a pointer mounted face upwardly at the bottom of the bore so that when the housing is attached to the lower end of the survey instrument casing containing the time controlled photographic means the dial will be in a position below the light source to be exposed to the downwardly directed illuminating rays and thereby permit photographing, and temperature responsive means also carried by the housing and having an element which extends outside the housing and is connected to the pointer to move it over the dial in response to temperature changes.

HARLAN J. EASTMAN.

REFERENCES CITED

The following references are of record in the file of this patent:

UNITED STATES PATENTS

| Number | Name | Date |
|---|---|---|
| 1,898,473 | Williston et al. | Feb. 21, 1933 |
| 1,901,431 | Bond | Mar. 14, 1933 |
| 2,144,762 | Kendall | Jan. 24, 1939 |
| 2,223,913 | Johnston | Dec. 3, 1940 |
| 2,265,098 | Bettis | Dec. 2, 1941 |
| 2,343,372 | Ford et al. | Mar. 7, 1944 |
| 2,365,487 | Murray | Dec. 19, 1944 |
| 2,382,609 | Dale | Aug. 14, 1945 |

FOREIGN PATENTS

| Number | Country | Date |
|---|---|---|
| 344,851 | Great Britain | Mar. 9, 1931 |